(12) United States Patent
Shin et al.

(10) Patent No.: US 8,255,927 B2
(45) Date of Patent: Aug. 28, 2012

(54) EVENT PROCESSOR

(75) Inventors: Hidehiko Shin, Osaka (JP); Hideaki Yajima, Osaka (JP); Akiko Miyayama, Osaka (JP); Kazuo Kitagawa, Hyogo (JP)

(73) Assignee: Panasonic Corporation, Osaka (JP)

( * ) Notice: Subject to any disclaimer, the term of this patent is extended or adjusted under 35 U.S.C. 154(b) by 888 days.

(21) Appl. No.: 12/373,974

(22) PCT Filed: Aug. 7, 2007

(86) PCT No.: PCT/JP2007/065453
§ 371 (c)(1),
(2), (4) Date: Jan. 15, 2009

(87) PCT Pub. No.: WO2008/018465
PCT Pub. Date: Feb. 14, 2008

(65) Prior Publication Data
US 2009/0328072 A1   Dec. 31, 2009

(30) Foreign Application Priority Data
Aug. 11, 2006 (JP) ................................. 2006-220272

(51) Int. Cl.
*G06F 9/44* (2006.01)
*G06F 17/00* (2006.01)
(52) U.S. Cl. ......... 719/318; 715/229; 715/234; 715/204
(58) Field of Classification Search .................. None
See application file for complete search history.

(56) References Cited

U.S. PATENT DOCUMENTS
7,631,255 B2 * 12/2009 Weise et al. ................... 715/229
2007/0271523 A1 * 11/2007 Lacey et al. ................... 715/762

FOREIGN PATENT DOCUMENTS
JP    05-046136     2/1993
WO   2005/093565   10/2005

OTHER PUBLICATIONS
International Search Report issued Oct. 23, 2007 in the International (PCT) Application of which the present application is the U.S. National Stage.
Wolfgang Pree, "Design Patterns for Object-Oriented Software Development," Addison-Wesley Publishing Company, 1995.

* cited by examiner

*Primary Examiner* — Andy Ho
*Assistant Examiner* — Tuan Dao
(74) *Attorney, Agent, or Firm* — Wenderoth, Lind & Ponack, LLP.

(57) ABSTRACT

An event control section 210 receives an event notification from an input operation control section 212. If the received event is a user ordered event based on an operation by a user 215, the event control section 210 gives the received event to a GUI content reproduction section 209. On the other hand, if the received event is a logic ordered event based on an order from a logic 201, notification of future generated user ordered events are temporarily stopped and the logic ordered event is notified to GUI content reproduction section 209. The temporary stop of notification of the user ordered event is released after completion of the logic ordered event at the GUI content reproduction section 209.

7 Claims, 10 Drawing Sheets

FIG. 2 http://www.xxx.com/xxx.html

FIG. 4A

| EVENT GENERATED COORDINATES | | | | DETERMINATION RESULT |
|---|---|---|---|---|
| X-COORDINATE STARTING POINT | X-COORDINATE ENDING POINT | Y-COORDINATE STARTING POINT | Y-COORDINATE ENDING POINT | |
| 200 | 230 | 0 | 30 | LOGIC ORDERED EVENT |
| 0 | 200 | 0 | 200 | USER ORDERED EVENT |
| 230 | 260 | 0 | 30 | LOGIC ORDERED EVENT |
| 0 | 210 | 210 | 220 | LOGIC ORDERED EVENT |

F I G. 4 B

| KEY CODE | DETERMINATION RESULT |
|---|---|
| 「 1 」 KEY | USER ORDERED EVENT |
| 「 # 」 KEY | LOGIC ORDERED EVENT |

EVENT PROCESSOR

TECHNICAL FIELD

The present invention relates to; an event processor that notifies a GUI content about an event generated during GUI content reproduction, a program that the event processor executes, and an integrated circuit that integrates a functional block of the event processor.

BACKGROUND ART

Generally, an application that attains a GUI (Graphical User Interface) has a GUI section that conducts interactions with a user, and a logic section that executes a process after receiving an order from the user. There are cases in which the GUI section of the application is changed in response to a scene in which the application is used, or in response to the user using the application. However, for some applications that have a specific architecture, it is a problem that makes it necessary to change not only the GUI section, but also both the GUI section and the logic section (i.e. the whole application).

A MVC (Model-View-Controller) pattern is known as architecture to solve such a problem. If an application is designed in accordance with the MVC pattern, a GUI provided by the application can be changed easily only by changing the GUI section (View and Controller). As described above, an application design method that applies the MVC pattern has a merit that allows using the logic section (Model) without changes when the GUI is changed. Details of MVC are described, for example, in non-patent reference 1.

A specific example of an application that provides the GUI is explained in the following.

A web browser, represented by Internet Explorer (registered trademark) from Microsoft Corporation, for example, is generally used as an application to display a content of the Internet. A screen display performed by a web browser is often realized by applying the MVC pattern. Specifically, of the application of the web browser, a section for displaying GUI for the user is attained as a GUI section, and an execution function by a server that is accessed by the web browser is realized as a logic section. In this case, GUI on the web browser can be changed, with change made only to the GUI section, not to the logic section.

A GUI section of a standard web browser is often realized by a GUI content (a content providing GUI) such as HTML (Hyper Text Markup Language), and a logic section is often realized by a program. Among the GUI contents with potential of being displayed by web browsers, beside HTML documents that are normally supported by web browsers, there are GUI contents that possess a richer expressiveness than HTML documents. In order to display various types of GUI contents on an existing web browser, other than those that are not normally supported and other than a HTML document; it is generally necessary to plug-in a GUI content reproduction section (e.g. a program) prepared for each type of GUI content to an existing web browser.

Specific examples of the GUI content other than the HTML document are; Macromedia Flash (registered trademark), SVG (Scalable Vector Graphics) standardized by W3C (World Wide Web Consortium) which is a consortium that develops and publishes internet standards, and OpenGL (registered trademark) which is the standard specification for 3-D graphics. These GUI contents are widely used by the public as a GUI section displayed on a web browser.

However, in recent years an attempt has been made to use such GUI contents described above not only as a content browsed on a web browser but also as a content for providing GUI for built-in devices.

FIG. 8 is a diagram schematically showing one example of a GUI content. A GUI content 1301 is a content with a combination of audios and animations such as Vector Graphics and the GUI content 1301 is generated by a GUI content generating device or a GUI content generating program.

The GUI content 1301 includes a plurality of scenes 1302a to 1302i. Furthermore, each of the scenes 1302a to 1302i includes a plurality of segments divided in a predetermined time interval. In the example in FIG. 8, the scene 1302a includes five segments 1303a to 1303e. Allocated to each scene or to each segment are, orders for a process to change a scene to another scene during reproduction of the GUI content 1301, a process or an object (display-content) to change a segment to another segment.

In order to make it possible to reproduce the GUI content 1301 described in FIG. 8, a GUI content reproduction device is used which has a GUI content reproduction section that corresponds to the GUI content to be reproduced. In addition to a function that reproduces a GUI content given from an application or the like, the GUI content reproduction device has a function of dynamically generating a GUI content reproduction section and a function of discarding the GUI content reproduction section. [Non-Patent Document 1] "Design Patterns for Object-Oriented Software Development" by Wolfgang Pree, Addison-Wesley Publishing Company, 1995.]

Generally in a instrument that provides GUI, there exist an event generated in accordance with a user operation by input devices such as an operation key or a mouse, and an event generated by a logic section. For example, in a case in which a terminal device is a mobile phone, the events generated by the logic section are: notifications of incoming phone calls, incoming mail and low battery capacity; alarms; display of contents processed by a scheduler; and the like. Hereinafter, an event used to convey the user order to the GUI content is referred to as "user ordered event", and an event used to convey the logic order to the GUI content is referred to as "logic ordered event".

The user ordered event and the logic ordered event are generated in a spontaneous timing and conveyed to the GUI content. Therefore, there are no problems in cases when both events are generated in different timings, but there is a possibility in which normal operation becomes interrupted in cases when both events are generated simultaneously and compete with each other. Hence, the GUI content reproduction section needs to be modified such that there are no problems even when both events compete with each other.

However, in most cases source codes of a program necessary to modify the GUI-content reproduction section are not disclosed, in reality making it difficult to modify the GUI content reproduction section. Therefore, when the GUI content reproduction section cannot be modified, one possible method is to allocate the logic ordered event to a part of a user ordered event operation, in order to mimic and utilize the part as the logic ordered event. FIG. 9 is a diagram of an example of a conventional content reproduction system's composition that uses this method.

However, even in this method, since the logic ordered event is essentially a part of the user ordered event, when the user ordered event and the logic ordered event are generated simultaneously, normal operation of the GUI content reproduction section may be interrupted as a result of a plurality of different events continuously notified to the GUI content reproduction section.

For example, there is a problem that a mouse cursor does not get displayed in accordance with the user's intent (a mouse cursor moves to a logic event button located outside of a screen display area, resulting in a state without the mouse cursor being displayed on the screen), when the logic ordered event is generated during generation of the user ordered event. Additionally, there is a problem that a process triggered by the logic ordered event becomes unstable (an executed process stops when a mouse cursor, located on a logic event button outside of a screen display area, is moved by a user operation) when the user ordered event is generated during generation of the logic ordered event.

SUMMARY OF THE INVENTION

Therefore, an objective of the present invention is to provide an event processor that is capable of simultaneously processing an event based on a user operation and an event based on a control by the logic, while utilizing an existing GUI content reproduction section.

The present invention is directed to an event processor; for notifying about a generated event to a GUI content reproduction section which reproduces a GUI content provided by the GUI, and outputs a reproduced display content to a drawing section. In order to achieve the objective, the event processor of the present invention includes; an event determining section, an event control section, a user operation storing section, a unlock condition section, and a lock control section.

The event determining section for determining whether the generated event is a user event based on a user operation via an input device or an event other than the user event. The event control section for notifying a GUI content reproduction section about the generated event based on a determination result from the event determining section. The user operation storing section for storing information about the user operation outputted from the event control section when the generated event is an event other than the user event. The unlock condition section for storing, when the generated event is an event other than the user event, contents generated by the GUI content reproduction section displayed before and after the execution of a process previously allocated to events other than the user event, each being stored as a first display-content and a second display-content; and the unlock condition section determines the match of the first display-content and the second display-content. The lock control section that controls stopping and restarting the update of drawing in the drawing section based on an order from the event control section. The event control section is operable to, when the generated event is an event other than the user event, stop notifying the GUI content reproduction section about user events that follows notification to the GUI content reproduction section about the event other than the user event, and at the same time order the lock control section to stop the update of drawing in the drawing section; and the event control section is also operable to, when the first display-content and the second display-content is determined as a match by the unlock condition section, order to have the information stored in the user operation storing section to be outputted to the GUI content reproduction section, order to restart the notification of the GUI content reproduction section about user events, and order the lock control section to restart the update of drawing in the drawing section.

Preferably, the user operation storing section stores cursor information as an information of the user operation in order to be able to specify coordinates of the drawing section on the screen. Furthermore, the event determining section determines whether the generated event is the user event or the event other than the user event based on; a coordinate position of a cursor on the display-content when the generated event is an event carried out by the cursor, or the kind of a key when the generated event is an event carried out by the key.

Each process conducted by each composition of the event process or may be viewed as an event processing method that provides a series of procedures. This method is offered as a form of program which causes a computer to execute the series of procedures. The program may be introduced to the computer in a recorded form as a computer readable recording medium. Furthermore, each composition of the event processor may be realized as a LSI which is an integrated circuit.

EFFECT OF THE INVENTION

According to the present invention, it is possible to simultaneously process an event generated by an input device based on a user operation and an event generated by a logic section, while utilizing an existing GUI content reproduction section.

BRIEF DESCRIPTION OF THE DRAWINGS

FIG. 2 is a diagram showing an example of an event generated by a GUI content.

FIG. 4A is a diagram showing one example of an event determination table referred to by the event determining section 205 in FIG. 3.

FIG. 4B is a diagram showing one example of an event determination table referred to by the event determining section 205 in FIG. 3.

DESCRIPTION OF THE REFERENCE CHARACTERS

Figure 1:
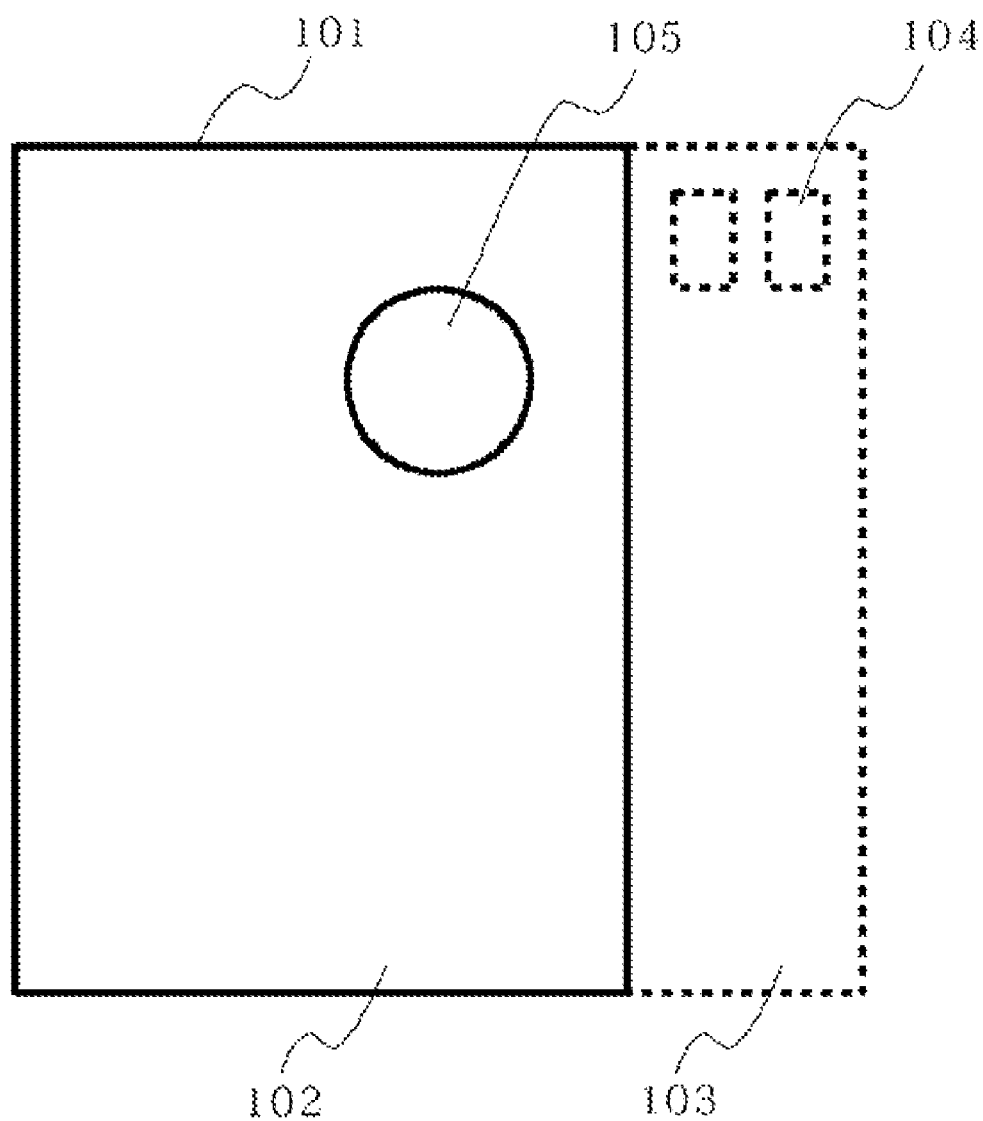
FIG. 1 is a schematic diagram of a screen-display-content generated when a GUI content is reproduced.

101 GUI content
102 user operation area
103 button placement area
104, 302 logic ordered event-receiving button
105, 303, 304, 305 object
201 logic
202 input device
204 event generation section
205 event determining section
206 user operation storing section
207 unlock condition section
208 lock control section 209 GUI content reproduction section
210 event control section
211 event processor
212 input operation control section
213 drawing section
214 drawing device
215 user
301 mouse cursor

DETAILED DESCRIPTION OF THE INVENTION

Prior to describing an event processor of the present invention, one example of a GUI content will be described. FIG. 1 describes a schematic diagram of a screen-display-content generated when a GUI content is reproduced. A GUI content 101 is a content capable of realizing a GUI on a screen, and provides a user operation area 102 that is displayed on the screen and a button placement area 103 that is not displayed on the screen.

A user operation area 102 is an area that provides the GUI for the user on a display screen in an instrument, and by a user operation of input devices such as a keyboard or a pointing device, the user operation area 102 generates a user ordered event allocated to the operation.

For example, an object 105, that changes a display-content or generates audio in accordance with the user ordered event, may be located on the user operation area 102. In particular, the GUI content 101 is composed such that, when the user conducts an operation so as to overlap a pointer (not shown) on the object 105, based on the user ordered event that generated by the user operation, the display-content of the object 105 changes, or music is reproduced or a sound effect is sounded.

A logic ordered event-receiving button 104 is located in a button placement area 103. Even though the button placement area 103 is not displayed on the screen, in case where the logic ordered event-receiving button 104 is pressed, that is, when a coordinate value of the pointer is in the area of the logic ordered event-receiving button 104 located outside the screen display, an event allocated for the logic ordered event-receiving button 104 is generated.

The button placement area 103 and the logic ordered event-receiving button 104 are provided in order to generate an event asynchronous to the user operation in response to orders from the logic of an application or the like. In order for the logic to generate an event in a spontaneous timing from the GUI content 101 or to notify the GUI content 101 of an event in a spontaneous timing, the logic uses the logic ordered event allocated to the button placement area 103 that is not displayed on the screen.

Figure 2:
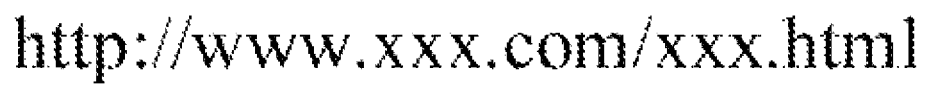

One example of an event generated by the GUI content is an event that notifies about a URL shown in FIG. 2. In response to the selection of the logic ordered event-receiving button 104 by the logic section, the GUI content generates an event that notifies the logic section about "http://www.xxx-.com/xxx.html". Upon receiving the URL, the logic section accesses a source external to the GUI content, such as the Internet, and acquires the data specified by the URL. And, the logic section can dynamically change the display-content or audio of the GUI content by reflecting the acquired data to the GUI content. A specific example of a GUI content is described above as Background Art.

In the example in FIG. 1, although the button placement area 103 is located outside the user operation area 102, the button placement area 103 may also be located being partially overlapped with the user operation area 102. Furthermore, the user ordered event may be a mouse event or a key event.

Moreover, the timing when the GUI content 101 generates an event may be when the pointer is placed on the logic ordered event-receiving button 104 or when the pointer is moved out from the logic ordered event-receiving button 104.

Figure 3:
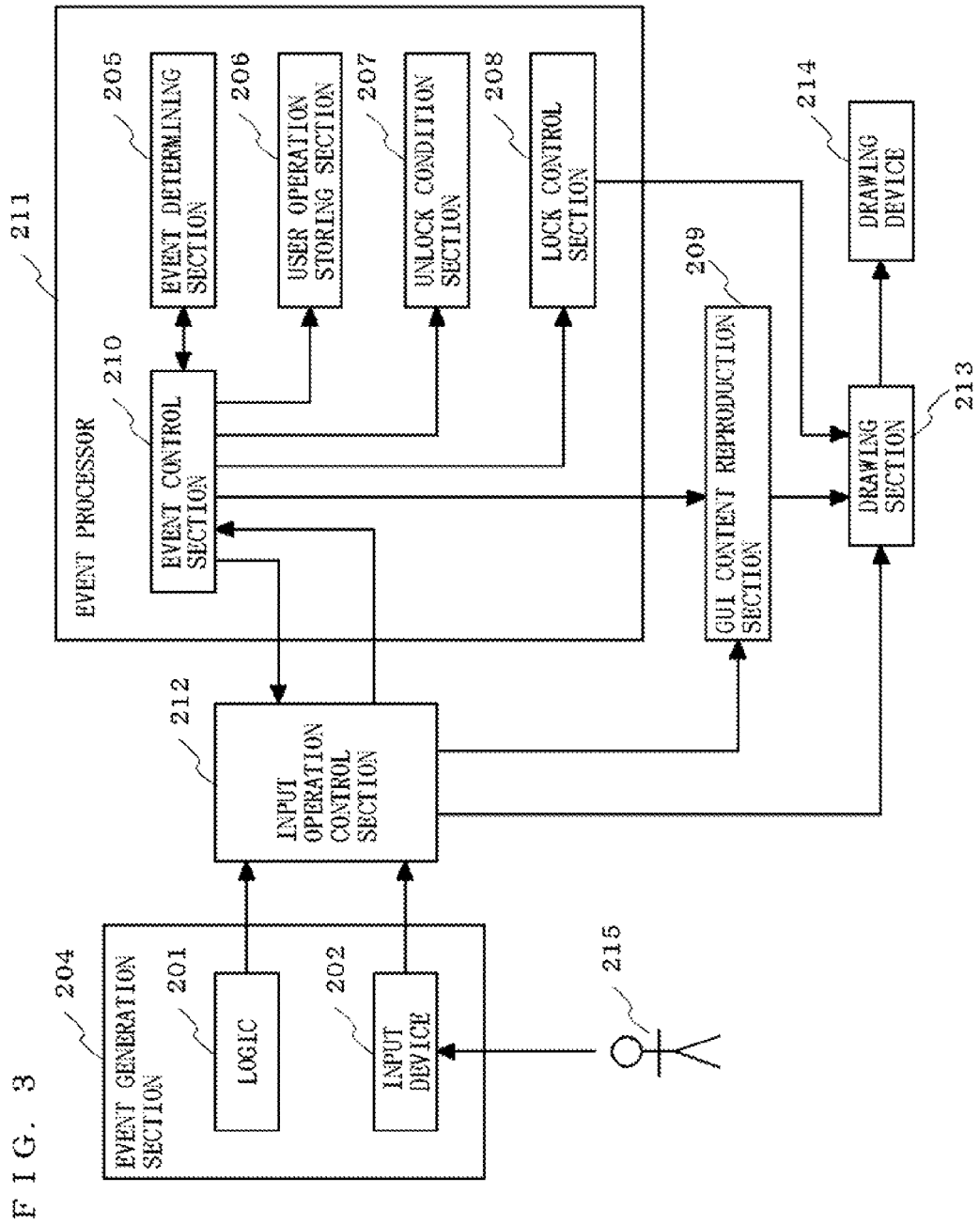
FIG. 3 is a diagram showing a composition of a content reproduction system which includes an event processor 211 according to one embodiment of the present invention.

Hereinafter, an event processor 211 of the present invention will be described. FIG. 3 is a diagram showing a composition of a content reproduction system which includes an event processor 211 according to one embodiment of the present invention. The content reproduction system shown in FIG. 3 includes, the event processor 211, an event generation section 204, an input operation control section 212, a GUI content reproduction section 209, a drawing section 213 and a drawing device 214. This system may be attained as, for example, a mobile phone device, a part or the whole of an electronic device such as a mobile terminal device, or a program or an integrated circuit that are integrated in these devices.

The event generation section 204 generates the user ordered event and the logic ordered event. In particular, the event generation section 204 corresponds to a logic 201 executed by the application and an input device 202. The input device 202 is not limited to a single form as long as it is capable of outputting a signal based on a user operation. For example, the input device 202 may be a pointing device such as a mouse or a touch panel, or may be a keyboard.

Upon receiving the user ordered event notified by the input device 202, the input operation control section 212 orders the drawing section 213 to draw a cursor position in compliance to the user operation and also notifies the event processor 211 about the received user ordered event. Additionally, upon receiving the logic ordered event notified by the logic 201, the input operation control section 212 notifies the event processor 211 about the received logic ordered event. The input operation control section 212 may notify the event processor 211 about the received event without ordering the drawing section 213 to draw a cursor position.

The GUI content reproduction section 209; reproduces the GUI content registered by a user 215 or the logic 201 via the input operation control section 212, and orders the drawing section 213 to update drawing of a reproduction-content. Additionally, the GUI content reproduction section 209 executes a process that corresponds to the e-vent notified by the event processor 211. A reproduction section provided for each type of GUI content may be utilized as the GUI content reproduction section 209.

The drawing section 213 controls drawing on the drawing device 214 such as displays. Additionally, the drawing section 213 draws the display-content generated by the GUI content reproduction section 209 on the drawing device 214, by reproducing the GUI content in accordance with a drawing demand from the event processor 211.

The event processor 211 receives the event notified by input operation control section 212 while the GUI content reproduction section 209 is reproducing the GUI content, and in accordance with the received event, orders the drawing section 213 to update the drawing of the reproduction-content. This event processor 211 includes; an event control section 210, an event determining section 205, a user operation storing section 206, an unlock condition section 207 and a lock control section 208.

The event control section 210 gives the received event to the event determining section 205, via the input operation control section 212, from the logic 201 or from the input device 202, and demands for a determination of the event. Then, the event control section 210 conducts a later described process for; the user operation storing section 206, the unlock condition section 207 and the lock control section 208, based on a determination result from the event determining section 205.

The event determining section 205 determines whether the event received from the event control section 210 is a user ordered event notified from the input device 202 or a logic ordered event notified from the logic 201. Then, the event determining section 205 returns the determination result to the event control section 210. Specifically, the event determining section 205 determines the type of the received event based on an event determination table. FIG. 4A and FIG. 4B are diagrams showing one example of the event determination table referred to by the event determining section 205.

FIG. 4A is an example in which, when a X-Y coordinate system is used to represent the display-content generated by reproducing the GUI content, among the display-content, an area allocated for the user ordered event and an area allocated for the logic ordered event are defined by a X-Y coordinate range. Assume an example of a case in which the event determining section 205 receives a cursor event indicating an event generation coordinates (100, 100). Since the event generation coordinates (100, 100) are within a rectangular area defined by start point (0, 0) and end point (200, 200), the event determining section 205 determines that the received event is a user ordered event. FIG. 4B is an example defining the correspondence of an event such as key pressing and the type of the event.

The user operation storing section 206 stores the information of a user operation such as cursor position (coordinates) and event type (key or mouse). The user operation storing section 206 may store a key code as the user operation. The unlock condition section 207: stores a bitmap information (unlock condition) of the display screen immediately before stoppage of the drawing-update given from the event control section 210; and determines whether or not a bitmap given from the event control section 210 during the update stoppage and the stored bitmap are identical. A reproduction screen ID may be used instead of the bitmap information of the display screen. Furthermore, in the case of audio, a music reproduction end position (e.g. the time information from the beginning) or a state of the sound effect (e.g. determination of before or after being sounded; or the number of sounded times) may be used. The lock control section 208, when given event orders from the control section 210, demands the drawing section 213; stoppage of drawing-update when order to stop drawing-update is given, and restart of drawing-update when order to restart drawing-update is given.

The event control section 210 notifies the GUI content reproduction section 209 about the received event when a returned result from the event determining section 205 indicates that the event is a user ordered event. On the other hand, the event control section 210 executes the following processes when a returned result from the event determining section 205 indicates that the event is a logic ordered event.

(a) Stores the user operation information such as current cursor positions in the user operation storing section 206.

(b) Stores the unlock condition in the unlock condition section 207.

(c) Orders the lock control section 208 to stop drawing-update.

(d) Orders the input operation control section 212 to stop the user ordered event notification.

(e) Orders the drawing section 213 via the GUI content reproduction section 209 to stop the cursor position drawing-update.

Subsequently, the event control section 210; notifies the GUI content reproduction section 209 about the logic ordered event, and when being notified by the GUI content reproduction section 209 that the process define by the event has finished, executes the following processes.

(f) Acquires the stored user operation from user operation storing section 206.

(g) Notifies the GUI content reproduction section 209 that the user operation stored in the user operation storing section 206 is a user ordered event.

(h) Acquires the determination result from the unlock condition section 207 of whether the unlock condition is satisfied or not.

(i) Orders the lock control section 208 to restart drawing-update when the determination result satisfies the unlock condition at process (h).

(j) Orders the input operation control section 212 to restart notification of the user ordered events.

(k) Orders the drawing section 213 to restart drawing-update of the cursor position.

The input operation control section 212 does not necessarily have to stop the drawing section 213 from updating the drawing of the cursor position (described above as (c)). In such a case, the drawing section 213 may draw the cursor at coordinates acquired from the user operation storing section 206 before being ordered by the lock control section 208 to restart drawing-update (described above as (i)).

Figure 5:
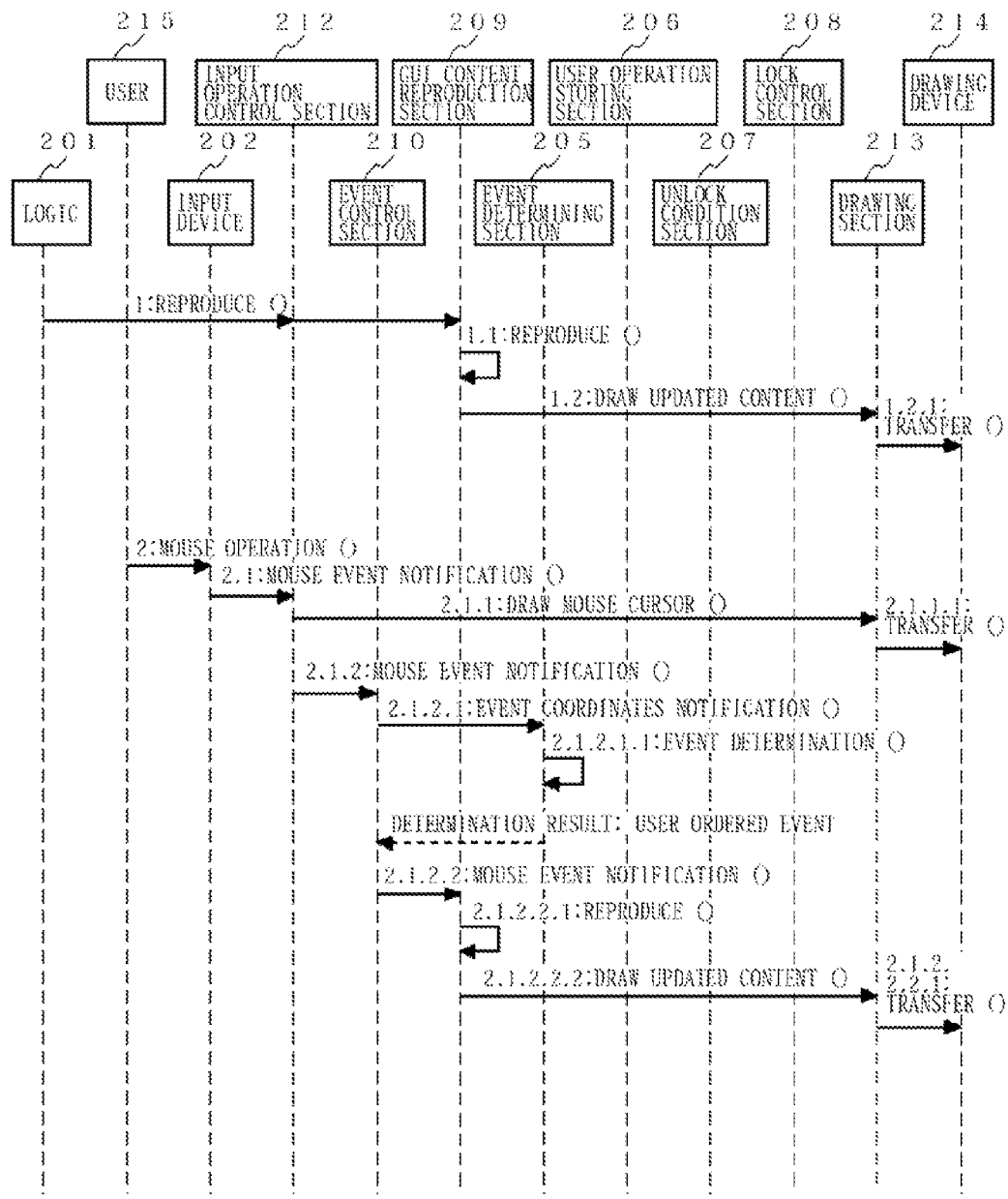
FIG. 5 is a sequence diagram illustrating the sequence of the event processor 211 after GUI content reproduction and reception of a user ordered event.
Figure 6:
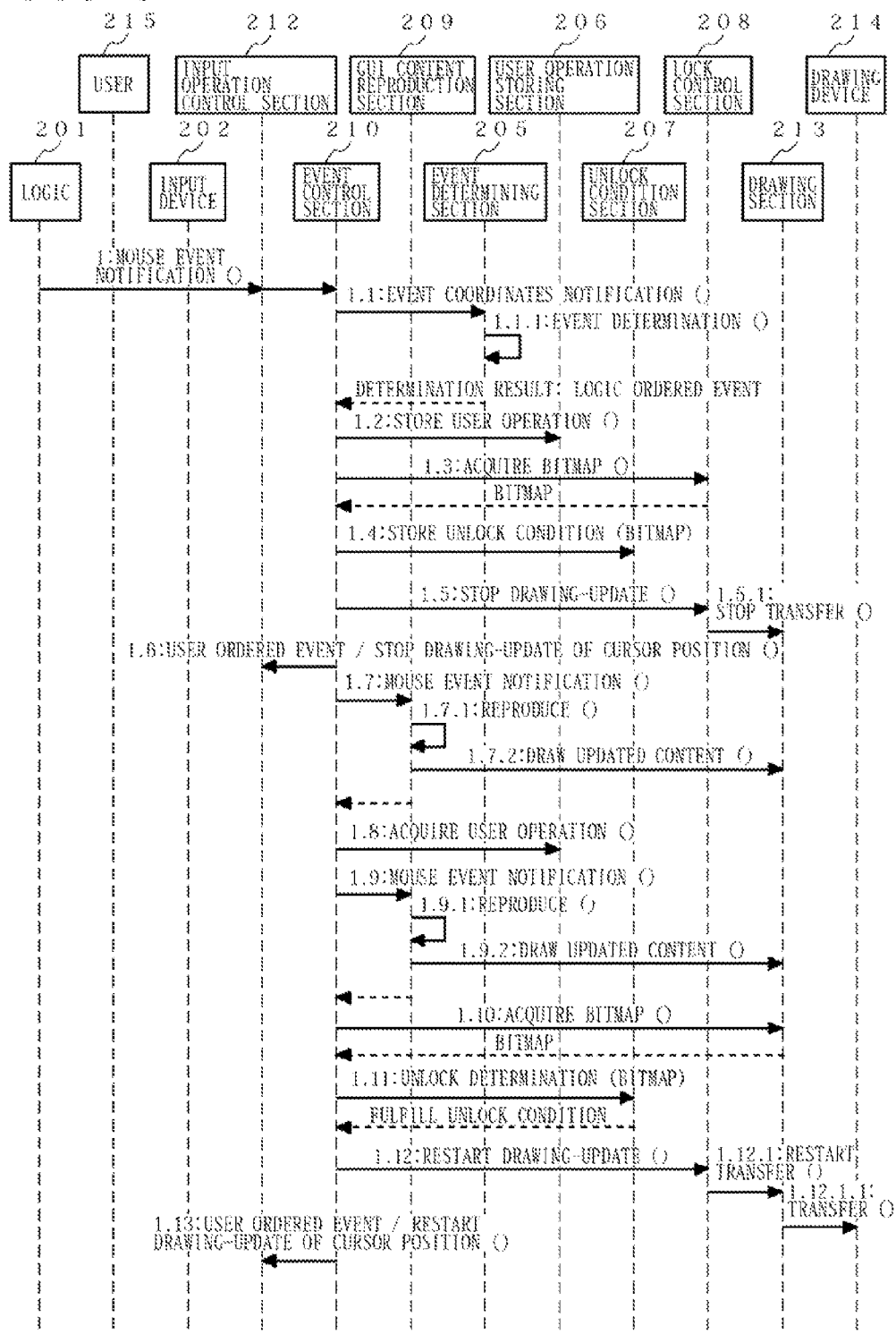
FIG. 6 is a sequence diagram illustrating the sequence of the event processor 211 after receiving a logic ordered event.
Figure 7:
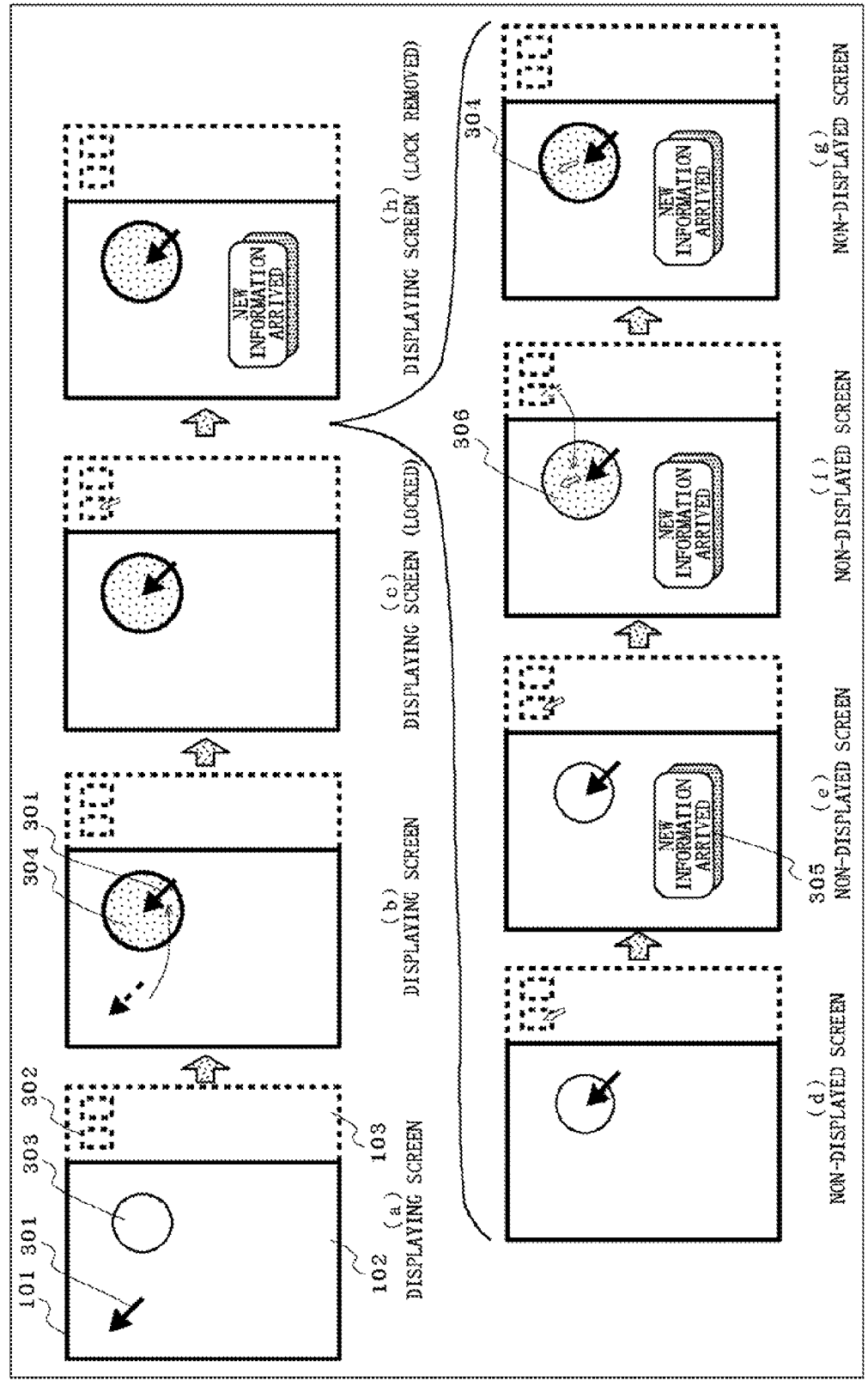
FIG. 7 is a diagram describing a displaying process of a GUI content that is being reproduced by the event processor 211.
Figure 8:
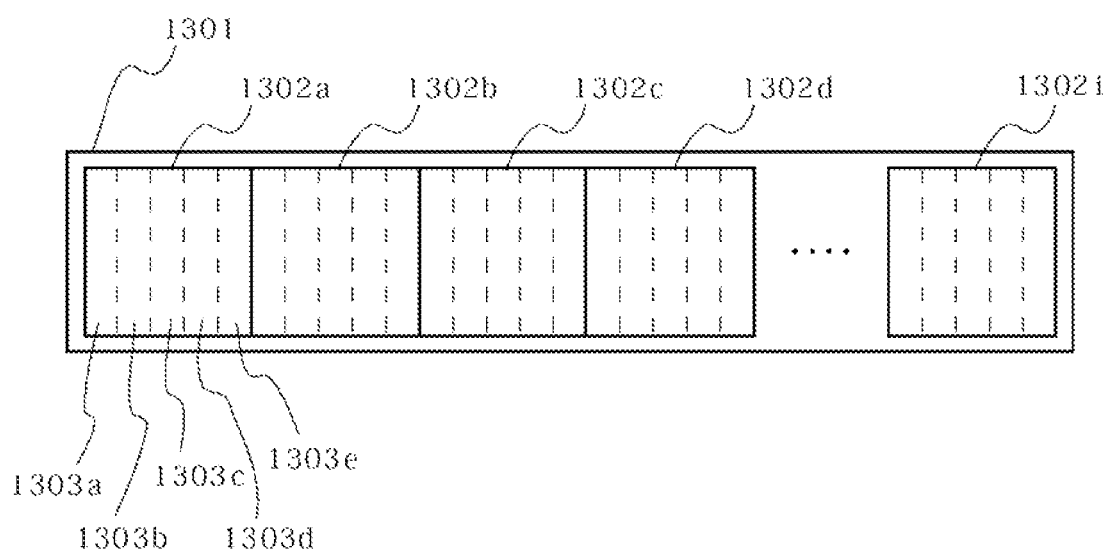
FIG. 8 is a diagram schematically showing one example of a GUI content.
Figure 9:
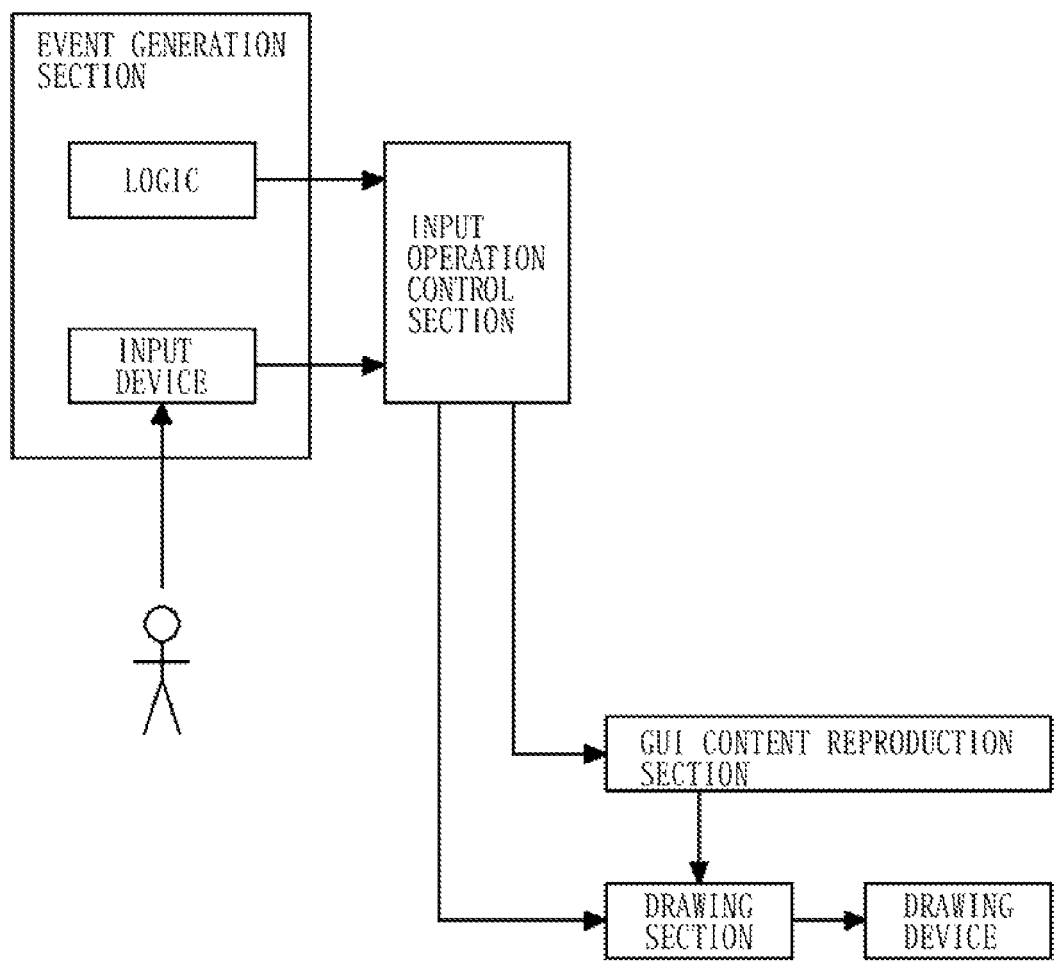
FIG. 9 shows a composition of a conventional content reproduction system.

FIG. 5 is a sequence diagram illustrating the sequence of the event processor 211 after GUI content reproduction and reception of a user ordered event. FIG. 6 is a sequence diagram illustrating the sequence of the event processor 211 after receiving a logic ordered event. FIG. 7 is a diagram describing a displaying process of a GUI content that is being reproduced by the event processor 211. FIG. 7 shows a GUI content example in which an object 303 is displayed as enlarged when the mouse cursor overlaps with object 303 located in the user operation area 102.

In the following, in reference to FIG. 5 to FIG. 7 and FIG. 3, details of the control process of the event processor 211 in the present invention are described separately as; the GUI content reproduction process, the user ordered event notifying process, and the logic ordered event notifying process. The description below assumes a case in which the input device 202 is a mouse, however, similar processes are also applicable to a case in which the input device 202 is not a mouse.

<A. GUI Content Reproduction Process>

(Step 1) The logic 201 notifies the GUT content reproduction section 209 about a GUI content reproduction demand via the input operation control section 212.

(Step 1.1) The GUI content reproduction section 209 reproduces a GUI content ordered by the logic 201.

(Step 1.2) The GUI content reproduction section 209 generates a drawing content by reproducing the GUI content and orders the drawing section 213 to update the screen with the generated drawing content.

(Step 1.2.1) The drawing section 213 transfers the drawing content received from the GUI content reproduction section 209 to the drawing device 214. As a result, the GUI content is displayed on the screen of the drawing device 214.

For example, when the GUI content contains an animation as display-content, steps 1.1 to 1.2.1 are repetitively processed at every frame that consists the animation.

<B. User Ordered Event-Notifying Process> (FIG. 5)

(Step 2) Next, a case is assumed in which the user 215 operates the input device 202 and overlaps the mouse cursor 301 on the object 303 during reproduction of the GUI content.

(Step 2.1) The input device 202 notifies the input operation control section 212 about a mouse event that corresponds to the mouse movement.

(Step 2.1.1) The input operation control section 212 orders the drawing section 213 to draw a mouse cursor.

(Step 2.1.1.1) In response to the order from the input operation control section 212, the drawing section 213 transfers the drawing of the mouse cursor to the drawing device 214.

The mouse cursor 301 is displayed as shown in (b) of FIG. 7 by the above processes.

(Step 2.1.2) The input operation control section 212 notifies the event control section 210 about the mouse event outputted from the input device 202.

(Step 2.1.2.1) The event control section 210 outputs coordinates of the mouse event to the event determining section 205 and orders to determine the event.

(Step 2.1.2.1.1) Based on an event determination table, the event determining section 205 determines whether the notified coordinates are included within the user operation area 102 or the button placement area 103. In the present example, the event determining section 205 returns a determination result, to the event control section 210, that it is a user ordered event.

In the example in (b) of FIG. 7, it is determined as a user ordered event since the mouse event coordinates are located in the user operation area 102.

(Step 2.1.2.2) The event control section 210 notifies the GUI content reproduction section 209 about the mouse event.

(Step 2.1.2.2.1) The GUI content reproduction section 209 conducts the process allocated to the event, and reproduces the display-content that shows an enlarged state of the object 303.

(Step 2.1.2.2.2) The GUI content reproduction section 209 orders the drawing section 213 to draw the reproduced display-content.

(Step 2.1.2.2.2.1) The drawing section 213 transfers the drawing content to the drawing device 214. As a result, the screen in the drawing device 214 is updated.

As a result of the above processes, a user interface is realized in which, for example, when the mouse cursor 301 is overlapped with the object 303, as shown in (a) of FIG. 7, the object 303 changes into an enlarged object 304, as shown in (b) of FIG. 7.

<C. Logic Ordered Event-Notifying Process> (FIG. 6)

Next, a case is considered in which the display-content of the user operation area 102 is changed asynchronously to a user operation. When assuming a case in which the terminal device is a mobile phone, the contents displayed asynchronously to the user operation are, for example, incoming phone calls, incoming mails, notifications of low battery capacity, alarms, displays of schedule content, or the like. Such displays are generated as needed and are not necessarily generated in accordance with an order from the user. Hence, the logic ordered event is utilized to display the necessary information on the screen in a spontaneous timing.

(Step 1) A case is assumed in which an object 305, which indicates that the application has received a newly arrived information, is displayed on the screen in the situation in (b) of FIG. 7. In order to have the GUI content reproduction section 209 to reproduce the object 305, the logic 201 generates a logic ordered event indicating that the mouse cursor is located within the logic ordered event-receiving button 302.

(Step 1.1) The event control section 210 notifies the event determining section 205 about coordinates of the mouse event and orders to determine the event.

(step 1.1.1) Based on an event determination table, the event determining section 205 determines whether the notified coordinates are included within the user operation area 102 or the button placement area 103. In the present example, the event determining section 205 returns a determination to the event control section 210 that it is a logic ordered event.

(Step 1.2) The event control section 210 stores the coordinates of the mouse cursor operated by the user 215 in the user operation storing section 206.

(Step 1.3) The even control section 210 acquires a bitmap displayed on the current screen from the drawing section 213. Instead of acquiring the bitmap from the drawing section 213, the event control section 210 may acquire the drawing content buffered by the GUI content reproduction section 209 as a bitmap.

(Step 1.4) The event control section 210 stores the acquired bitmap in the unlock condition section 207 as an unlock condition.

(Step 1.5) The even control section 210 orders the lock control section 208 to stop drawing-update.

(Step 1.5.1) In response to the order from the event control section 210 to stop drawing-update, the lock control section 208 orders the drawing section 213 to stop the transfer of the drawing content to the drawing device 214.

(Step 1.6) The event control section 210 orders the input operation control section 212 to stop notifying the user ordered events. Additionally, the event control section 210 orders the drawing section 213 to stop updating the cursor position.

With the above-described processes, during the stoppage of drawing-update, a screen shown in (c) of FIG. 7 is kept on being displayed continuously on the drawing device 214 (screen lock).

(Step 1.7) The mouse event notified as the logic ordered event in step 1 is notified by the event control section 210 to the GUI content reproduction section 209. Here, the logic ordered event-receiving button 302 shown in (d) of FIG. 7 is notified about the event.

(Step 1.7.1) The GUI content reproduction section 209 reproduces a process allocated to the mouse event.

(Step 1.7.2) The GUI content reproduction section 209 orders the drawing section 213 to update the display screen with the reproduced display-content. This step 1.7.2 may be omitted. The update result is shown in the drawing in (e) of FIG. 7 (drawing of the object 305).

(Step 1.8) The event control section 210 acquires the mouse cursor coordinates from the user operation storing section 206.

(Step 1.9) The event control section 210 outputs the mouse cursor coordinates acquired from the user operation storing section 206 to the GUI content reproduction section 209, and notifies about the mouse event.

(Step 1.9.1) The GUI content reproduction section 209 conducts a reproduction process.

(Step 1.9.2) The GUI content reproduction section 209 orders the drawing section 213 to update drawing of the updated display-content. This step 1.9.2 may be omitted.

(Step 1.10) The event control section 210 acquires a bitmap of the updated screen from the drawing section 213. Instead of acquiring the bitmap from the drawing section 213, the event control section 210 may acquire the drawing content buffered by the GUI content reproduction section 209 as a bitmap.

(Step 1.11) In order to determine whether the unlock condition is satisfied or not, the event control section 210 outputs the acquired bitmap to the unlock condition section 207. In particular, the unlock condition section 207 determines whether or not the bitmap outputted from the event control section 210 in step 1.11 and the bitmap stored at step 1.3 matches. Then, the unlock condition section 201; returns information to the event control section 210 indicating that the unlock condition is satisfied (the case in FIG. 5) when the two bitmaps matches (object 304 of (g) in FIG. 7), and returns an information to the event control section 210 indicating that the unlock condition is not satisfied for other cases (object 306 of (f) in FIG. 7).

(Step 1.12) The event control section 210 orders the lock control section 208 to restart update of the display screen (or reproduce music from the reproduction-finished position)

(Step 1.12.1) In response to the update restart order from the event control section 210, the lock control section 208 orders the drawing section 213 to restart the transfer of the drawing content to the drawing device 214.

(Step 1.12.1.1) In accordance with the order by the lock control section 208, the drawing section 213 restarts the transfer of the drawing content to the drawing device 214.

(Step 1.13) The event control section 210 orders the input operation control section 212 to restart notification of user ordered events, and at the same time orders the drawing section 213 to restart update of the cursor position.

With the above-described processes, the contents shown in (d) to (g) of FIG. 7 are sequentially processed internally and the displaying process of the object 305 is completed, and then screen lock is removed as shown in (h) of FIG. 7, and then a GUI content with a user ordered event reflected by a logic ordered event on is reproduced.

As described above, with the event processor 211 according to one embodiment of the present invention, screen update of the drawing section 213 is stopped in response to logic ordered event generation. Accordingly, mouse cursor display change against the user's intent can be prevented because the display-content immediately preceding the logic ordered event generation is continuously displayed on the screen.

Furthermore, with the event processor 211, the input operation control section 212 is ordered to stop notifying a user ordered event in response to logic ordered event generation. This makes it possible to avoid interference between a notification of a user ordered event and a notification of a logic ordered event. During the stoppage of the notification of a user ordered event, a user ordered event generated by a GUI content may be ignored.

Furthermore, with the event processor 211, a user operation that stopped, during notification of a logic ordered event by logic 201 to the event control section 210, is stored in the user operation storing section 206. As a result, once after the logic ordered event is finished, based on coordinates stored in the user operation storing section 206, it is possible for the event control section 210 to execute a process that corresponds to the user ordered event.

Furthermore, the above-described embodiment may also be realized by causing a computer to execute a program which can cause the computer to execute the above-described procedures stored in a storage device (i.e. ROM, RAM, hard disk, etc.). The computer here is a concept that includes a computer incorporated in a mobile terminal device. In this case, the program may be executed after being stored in a storage device via a recording medium, or may be directly executed from a storage medium. Here, a storage medium refers to: semiconductor memories such as ROMs, RAMs and flash memories; magnetic disc memories such as flexible disks and hard disks; optical disks such as CD-ROMs, DVDs and BDs; and recording media such as memory cards. Furthermore, a recording medium is a concept that includes communication media such as phone lines and carrier channels.

Furthermore, a functional block (FIG. 3) of the event processor according to the above-described embodiment may be realized as a LSI, which is an integrated circuit. These functional blocks may be single-chipped, or may be single-chipped so as to include a part or the whole of the functional block. Even though LSI is referred to in the above description, depending on the difference in the degree of integration, it is also called as an IC, a system LSI, a super LSI or an ultra LSI. Furthermore, the method for circuit-integration is not limited to LSI, and may be realized through circuit-integration of a dedicated circuit or a general-purpose processor. Furthermore, a FPGA (Field Programmable Gate Array) that is capable of programming after manufacturing the LSI or a reconfigurable processor capable of reconstituting connections and configurations of a circuit cell within the LSI, may be used. Additionally, if a technology for circuit-integration that replaces the LSI is introduced with the advance in semiconductor technology or derivation from other technologies, obviously, such technologies may be used for integrating the functional block. One such possibility is the application of biotechnology.

Industrial Applicability

An event processor of the present invention is applicable to an information processing terminal or the like which has a screen displaying device such as a mobile phone, a PDA, a digital camera, a PC and a car navigation system; and particularly useful in a case in which simultaneous processing of an event based on a user order and an event based on a logic order is desired without any modifications to an existing GUI content reproduction section.

The invention claimed is:

1. An event processor for notifying about a generated event to a Graphic User Interface (GUI) content reproduction section which reproduces a GUI content provided by the GUI, and outputs a reproduced display content to a drawing section; the event processor comprising:

an event determining section for determining whether the generated event is a user event based on a user operation via an input device or an event other than the user event;

an event control section including an interface, for notifying the GUI content reproduction section about the generated event based on a determination result from the event determining section;

a user operation storing section comprising a memory device, for storing information about the user operation outputted from the event control section when the generated event is an event other than the user event;

an unlock condition section; for storing, when the generated event is an event other than the user event, contents generated by the GUI content reproduction section and displayed before and after the execution of a process previously allocated to the event other than the user event, each being stored as a first display-content and a second display-content; and for determining the match of the first display-content and the second display-content; and a lock control section that controls stopping and restarting the update of drawing in the drawing section based on an order from the event control section; wherein the event control section, stops notifying the GUI content reproduction section about user events that follow notification to the GUI content reproduction section about the event other than the user event, and at the same time orders the lock control section to stop the update of drawing in the drawing section, when the generated event is an event other than the user event; and orders to have the information stored in the user operation storing section to be outputted to the GUI content reproduction section, and orders to restart the notification of the GUI content reproduction section about user events, and orders the lock control section to restart the update of drawing in the drawing section, when the first display-content and the second display-content is determined as a match by the unlock condition section.

2. The event processor according to claim 1, wherein:
the user operation storing section stores cursor information as an information of the user operation in order to be able to specify coordinates of the drawing section on the screen.

3. The event processor according to claim 1, wherein the event determining section determines whether the generated event is the user event or the event other than the user event based on a coordinate position of a cursor on the display-content when the generated event is an event carried out by the cursor.

4. The event processor according to claim 1, wherein:
the event determining section determines whether the generated event is the user event or the event other than the user event based on the kind of a key when the generated event is an event carried out by the key.

5. An event processing method for notifying about a generated event to a Graphic User Interface (GUI) content reproduction section which reproduces a GUI content provided by the GUI and outputs a reproduced display content to a drawing section; the event processing method comprising:
a step of making a determination of whether a generated event is a user event based on a user operation via an input device or an event other than the user event; wherein
when the generated event is determined as a user event resulting from the determination, a step of notifying the GUI content reproduction section about the generated user event;
when the generated event is determined as an event other than a user event resulting from the determination;
a step of storing an information of the user operation;
a step of notifying the GUI content reproduction section about the generated event other than the user event;
a step of stop notifying the GUI content reproduction section about the user event generated after the notification;
a step of stopping drawing-update of the drawing section;
a step of storing contents generated by the GUI content reproduction section displayed before and after the execution of a process previously allocated to events other than the user event, each being stored as a first display-content and a second display-content, and the step determines the match of the first display-content and the second display-content;
a step of outputting the stored information to the GUI content reproduction section when the first display-content and the second display-content matches;
a step of restart notifying the GUI content reproduction section about the user event; and
a step of restarting drawing-update of the drawing section.

6. A non-transitory storage medium having a computer-readable program stored therein, for causing the computer to execute an event processing method, for notifying about a generated event to a Graphic User Interface (GUI) content reproduction section which reproduces a GUI content provided by the GUI, and for outputting a reproduced display content to a drawing section, the event processing method comprising:
a step of making a determination of whether a generated event is a user event based on a user operation via an input device or an event other than the user event; wherein
when the generated event is determined as a user event resulting from the determination, a step of notifying the GUI content reproduction section about the generated user event;
when the generated event is determined as an event other than a user event resulting from the determination;
a step of storing an information of the user operation;
a step of notifying the GUI content reproduction section about the generated event other than the user event;
a step of stop notifying the GUI content reproduction section about the user event generated after the notification;
a step of stopping drawing-update of the drawing section;
a step of storing contents generated by the GUI content reproduction section displayed before and after the execution of a process previously allocated to events other than the user event, each being stored as a first display-content and a second display-content, and the step determines the match of the first display-content and the second display-content;
a step of outputting the stored information to the GUI content reproduction section when the first display-content and the second display-content matches;
a step of restart notifying the GUI content reproduction section about the user event; and
a step of restarting drawing-update of the drawing section.

7. An integrated circuit consisting of circuits being integrated for notifying about a generated event to a Graphic User Interface (GUI) content reproduction section which reproduces a GUI content provided by the GUI, and outputs a reproduced display content to a drawing section; the integrated circuit integrating:
an event determining section for determining whether the generated event is a user event based on a user operation via an input device or an event other than the user event;
an event control section for notifying the GUI content reproduction section about the generated event based on a determination result from the event determining section;
a user operation storing section for storing information about the user operation outputted from the event control section when the generated event is an event other than the user event;
an unlock condition section for storing, when the generated event is an event other than the user event, contents generated by the GUI content reproduction section displayed before and after the execution of a process previously allocated to events other than the user event, each being stored as a first display-content and a second display-content; and the unlock condition section determines the match of the first display-content and the second display-content; and
a lock control section that controls stopping and restarting the update of drawing in the drawing section based on an order from the event control section; wherein
the event control section is operable to, when the generated event is an event other than the user event, stop notifying the GUI content reproduction section about user events that follow notification to the GUI content reproduction section about the event other than the user event, and at the same time order the lock control section to stop the update of drawing in the drawing section; and the event control section is also operable to, when the first display-content and the second display-content is determined as a match by the unlock condition section, order to have the information stored in the user operation storing section to be outputted to the GUI content reproduction section, and restart the notification of the GUI content reproduction section about user events, and order the lock control section to restart the update of drawing in the drawing section.

* * * * *